Figure 1:
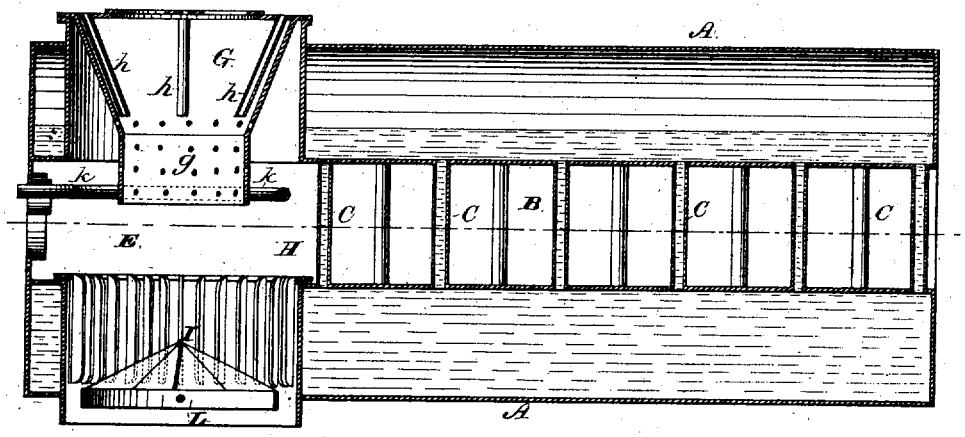

2 Sheets—Sheet 1.

C. W. REED.

Steam Boiler and Furnace.

No. 8,730. Reissued June 3, 1879.

WITNESSES:

Jas. E. Hutchinson.

J. A. Rutherford

INVENTOR.

Cullin W. Reed,

By James L. Norris

Attorney

C. W. REED.

Steam Boiler and Furnace.

No. 8,730. Reissued June 3, 1879.

WITNESSES:

Jas. C. Hutchinson

J. A. Rutherford

INVENTOR.

Cullin W. Reed,

By James L. Norris,

Attorney.

UNITED STATES PATENT OFFICE.

CULLIN W. REED, OF CHAGRIN FALLS, OHIO.

IMPROVEMENT IN STEAM-BOILERS AND FURNACES.

Specification forming part of Letters Patent No. 209,514, dated October 29, 1878; Reissue No. 8,730, dated June 3, 1879; application filed February 21, 1879.

*To all whom it may concern:*

Be it known that I, CULLIN W. REED, of Chagrin Falls, in the county of Cuyahoga and State of Ohio, have invented certain new and useful Improvements in Steam-Boilers and Furnaces, of which the following is a specification.

This invention relates to improvements in horizontal steam-boilers and means for heating the water therein, its object being to prevent the deposition of sediment upon, and consequent incrustation of, tubes and walls of the boiler exposed to direct heat of the furnace by securing within and at the base of the boiler an unagitated body or pool of water in contact with a base-wall not exposed to direct furnace-heat, and in which all sediment will settle, and not be caked or baked, but remain soft and easily removable; to produce a perfect circulation of the water with a minimum agitation; to provide for the thorough combustion within the boiler and in contact with water-heating walls of the gases generated from the fuel used, and to facilitate the coking of the bituminous varieties of coal when used and the combustion of said coal and its gaseous products.

My invention consists, first, in the combination, with a horizontal boiler having a horizontal flue, through which extend a series of vertical flues, of a furnace provided with a vertical grate and a magazine located in the upper part, the lower part of said magazine being surrounded by an annular air-tube communicating with the open air, the upper part of the magazine being provided inside with a series of air-tubes extending from the top of said magazine downward, the vertical grate, annular air-tube, and the tubes in the magazine all operating in conjunction to supply a large amount of air to the combustion-chamber, in order to consume the tar and gases generated in the lower part of the magazine, whereby the magazine is prevented from becoming clogged and an intense heat is produced in the combustion-chamber; second, in the combination, in a horizontal boiler, of a horizontal rectangular flue running the entire length of the boiler, a vertical chamber open from top to bottom and extending through the horizontal flue and the water and steam spaces of said boiler, a fuel-magazine in the upper portion of said chamber, around which is formed a combustion-chamber, and a fire-box in the lower portion thereof, said fire-box being below the bottom of the rectangular flue, as more fully hereinafter specified.

Figure 2:
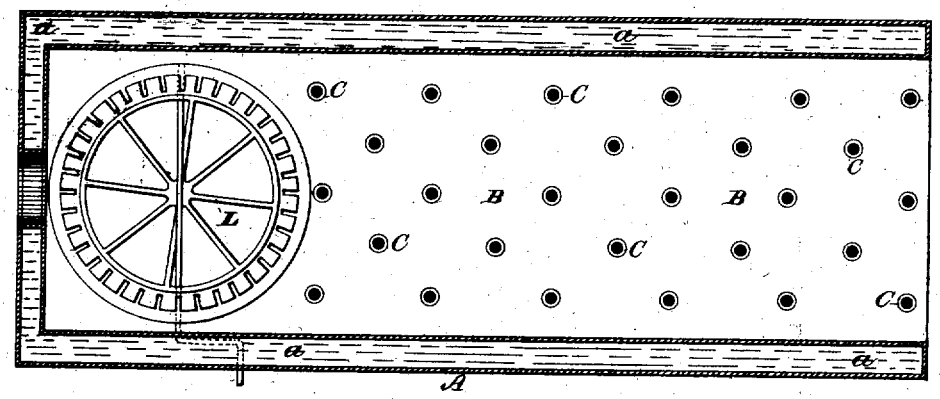
Figure 3:
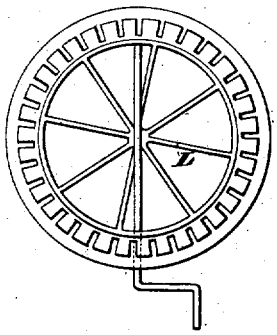
Figure 4:
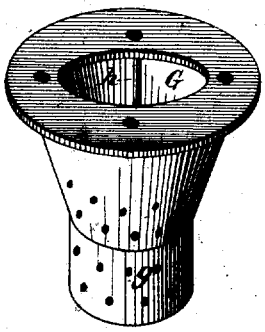
Figure 5:
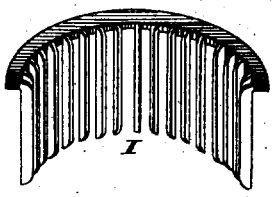
Figure 6:
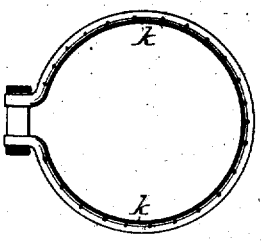
Figure 7:
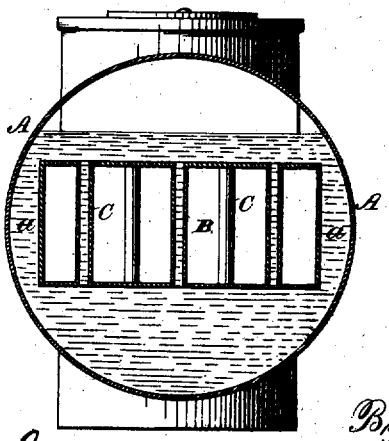

In the drawings, Figure 1 represents a vertical longitudinal section of my improved boiler; Fig. 2, a horizontal section of the same. Fig. 3 represents a top view of the fire-box with the top and magazine removed. Fig. 4 represents a detached perspective view of the magazine; Fig. 5, a detached perspective view of the vertical portion of the grate. Fig. 6 is a plan view of the annular perforated tube for supplying air to the combustion flue or chamber. Fig. 7 is a front view of the boiler and furnace-flue.

The letter A designates a cylindrical shell or outer casing of a horizontal boiler, and B a rectangular flue extending from end to end thereof and united at the heads of the same. Said flue is of such size as to leave a continuous water-space around it, and is stay-bolted to the boiler in order to hold said flue firmly in position.

The water-spaces *a* at the sides of the flue have a combined capacity, which is much less than that of the water-space below the flue, so that the downward flow of circulating water can never have sufficient volume to displace the whole body of water in the lower space or agitate that portion of the water which lies at the base of the boiler, which, consequently, forms a steady pool, into which all sediment will settle.

Within the flue and extending through it are set a series of water-tubes or small flues, C, which connect the upper and lower portions of the water-space. These tubes are shouldered near their ends, and are calked on the water-surface of the flue-sheets, instead of on the fire-surface of the same, whereby all liability of the ends of said tubes to be burned out is entirely avoided. The tubes are arranged in transverse parallel rows, those of each row standing opposite the spaces between the tubes of the rows on each side of it, whereby the products of combustion are compelled to take a zigzag course through the rectangular flue and around the tubes, by means of which the heat is effectually absorbed and thoroughly utilized.

The letter E indicates the furnace, which is located at the forward end of the boiler. Said furnace is formed in three sections, the upper section forming a receptacle for a magazine, the intermediate section the combustion-chamber, which is formed by the forward end of the flue B, and the lower section forming the fire-box of the furnace. In the upper section is located a magazine, G, consisting of an inverted frustum-shaped shell having a short cylindrical downward extension, *g*, at its lower end. The lower part of said section and the cylindrical extension are preferably perforated, as shown, in order to permit the tar and gases generated from the heated coil to escape into the combustion-chamber and be consumed. The perforations, however, may be omitted, and the tarry matters will escape from the open lower end of the magazine.

From the upper part of the magazine extend downward a series of air flues or tubes, *h*, which communicate with the open air at their upper ends, and terminate at their lower ends on or about a line with the upper series of perforations in said magazine when it is perforated. These flues serve to admit air to the gases generated in the lower part of the magazine, so as to insure the combustion of the same in the combustion-chamber.

The letter E indicates the combustion chamber or flue, in which the lower end of the magazine extends. Said combustion-chamber being located in the forward end of the flue B, the burning gases and heated products of combustion pass directly on from said chamber through the flue toward the smoke-stack, a thorough combustion of the gases taking place within said flue.

The letter *k* represents an annular pipe, perforated on the lower side, located within the combustion-chamber, and surrounding the lower part of the magazine, its ends communicating with the open air, whereby a current of air in jets is admitted into the combustion-chamber to mingle with and facilitate the combustion of the gases.

The letter I represents the fire-box, which may be of any desired shape, in the present instance being cylindrical, which is the most convenient form. Within said fire-chamber is located a vertical grate or series of grate-bars along the sides of the fire-box, said grate being of a configuration to correspond with the fire-box. In the present instance the said grate is cylindrical in shape, and is made in two sections for convenience of insertion and removal. The top of the grate is constructed with an annular flange, which rests upon the upper edge of the fire-box and holds it in place.

The letter L indicates the conical grate, pivoted at the lower part of the fire-box in such manner that it can be readily and conveniently dumped.

The operation of my invention is as follows: The fire is started in the furnace and the magazine properly filled with coal at the top. The air, entering from below the furnace, passes up through the conical grate into the center of the fuel, and at the same time up between the vertical grate-bars, insuring perfect combustion of the fuel, and preventing the same from coming into actual contact with the walls of the fire-box, whereby all liability of injury to the same by the intense heat of the burning fuel is obviated. The flames and products of combustion pass upward into the combustion or flue chamber, where they are met by the tarry matter and gases escaping from the magazine and by the current of air-jets from the annular pipe in the combustion-chamber. These tarry matters and gases are ignited, and the combined products of the combustion of these and the burning fuel in the fire-box pass into the rectangular flue, where they are compelled to circulate thoroughly between and around the short pipes, by means of which the heat is thoroughly absorbed on the passage of the heated products to the smoke-stack.

The vertical grate, the annular tube, and the perforated magazine, with the air-tubes in its upper part extending downward to the perforated part of the magazine, all operate to supply a large amount of air to the combustion-chamber, which is necessary when burning bituminous coal, to consume the tarry matter and gases generated in the magazine, and which, if not consumed, would clog the magazine, and would cause deposits in the flues and entail the loss of valuable combustible material.

It will be seen that as thus constructed the boiler has the combined advantages of a horizontal and vertical boiler, inasmuch as the tubes or flues in the horizontal flue provide for direct upward currents of water in the same manner as in a vertical boiler, which is the most effective arrangement, as the circulation of the water is much more rapid in such than where it has to circulate through horizontal tubes. As the furnace is entirely surrounded by water, it will be evident that no heat can be lost by radiation.

The furnace is adapted to the use of any variety of coals, bituminous as well as anthracite, as the tarry matters and gases are burned off in the magazine, coking the coal as it reaches the lower part of the same, in which condition it readily feeds downwardly into the fire-pot.

The perpendicular wedge-like space around the upper part of the magazine is a hot-air space, which assists to heat the coal when first put into the magazine, and also aids in keeping the steam in the steam-space dry.

By reason of the large number of water-tubes, the water is divided into numerous small columns, whereby the steam is much more rapidly generated than in boilers of ordinary construction; and as the main body of the water is below the flue and lower ends of the circulation-tubes, and the return water-passages at the sides of the flue being of such capacity as not to cause the displacement or agitation of the base water, a steady pool is secured, where all sediment settles, entirely away from the fire-surface, thus preventing the incrustation and burning of the boiler by reason of the collection of such sediment, and thereby obviating the most serious danger attendant upon the use of steam-boilers, the agitation of the water in the upper part of the boiler preventing the sediment from settling on the flat upper surface of the rectangular flue. By means of suitable man-holes at the top and bottom, with ample room to work above and below the rectangular flue, provision is made for readily cleaning and repairing the boiler.

All cold drafts at the time of charging the furnace, which are most objectionable in the ordinary furnaces, are wholly done away with, as there are no doors leading directly into the combustion-chamber or fire-box, the coal being charged into the magazines. Consequently the fires are never deadened nor the heating-surfaces cooled, as in other boilers. It requires little attention, and combines simplicity, strength, durability, safety, adaptability, and economy, does not exceed in cost the fire-box tubular boiler, and is adapted to locomotive, marine, or stationary work, as well as general heating purposes.

What I claim is—

1. In combination with a boiler having a horizontal flue, a furnace having a vertical grate and a magazine in its upper part, the lower part of said magazine being surrounded with a perforated air-tube communicating with the open air, the upper part of the magazine being provided inside with a series of air-tubes extending from the top downward, all operating in conjunction to supply a large amount of air to the combustion-chamber, whereby the tar and gases generated in the magazine are consumed, in order to prevent clogging and intensify the heat, substantially as specified.

2. The combination, in a horizontal boiler, of a horizontal rectangular flue running the entire length of the boiler, a vertical chamber open from top to bottom and extending through the horizontal flue and the water and steam spaces of said boiler, a fuel-magazine in the upper portion of said chamber, around which is formed a combustion-chamber, and a fire-box in the lower portion thereof, said fire-box being below the bottom of the rectangular flue, substantially as described.

In testimony that I claim the foregoing I have hereunto set my hand in presence of the subscribing witnesses.

CULLIN W. REED.

Witnesses:
I. W. WILLIAMS,
C. H. GARDNER.